United States Patent [19]
Sako

[11] Patent Number: 5,852,804
[45] Date of Patent: Dec. 22, 1998

[54] METHOD AND APPARATUS FOR SPEECH RECOGNITION

[75] Inventor: Kazuya Sako, Kakogawa, Japan

[73] Assignee: Fujitsu Limited, Kawasaki, Japan

[21] Appl. No.: 838,909

[22] Filed: Apr. 11, 1997

Related U.S. Application Data

[63] Continuation of Ser. No. 253,218, Jun. 2, 1994, abandoned, which is a continuation of Ser. No. 801,546, Dec. 2, 1991, abandoned.

[30] Foreign Application Priority Data

Nov. 30, 1990 [JP] Japan ................................ 2-334766

[51] Int. Cl.$^6$ .............................. G10L 5/02; G10L 5/06; G10L 9/00
[52] U.S. Cl. .................. 704/275; 704/243; 704/244; 704/245
[58] Field of Search .................... 704/275, 243, 704/244, 245

[56] References Cited

U.S. PATENT DOCUMENTS

| | | | |
|---|---|---|---|
| 4,158,750 | 6/1979 | Sakoe et al. | 395/2 |
| 4,181,813 | 1/1980 | Marley | 395/2 |
| 4,426,733 | 1/1984 | Brenig | 395/2 |
| 4,528,687 | 7/1985 | Noso et al. | 395/2 |
| 4,532,648 | 7/1985 | Noso et al. | 395/2 |
| 4,618,984 | 10/1986 | Das et al. | 395/2 |
| 4,725,956 | 2/1988 | Jenkins | 364/434 |
| 4,827,520 | 5/1989 | Zeinstra . | |
| 4,862,363 | 8/1989 | Krisher et al. . | |
| 4,864,622 | 9/1989 | Iida et al. | 395/2 |
| 4,896,357 | 1/1990 | Hatano et al. | 395/2 |
| 5,199,080 | 3/1993 | Kimura | 704/275 |
| 5,349,687 | 9/1994 | Ehlig | 704/275 |

FOREIGN PATENT DOCUMENTS

| | | |
|---|---|---|
| 0 077 194 | 4/1983 | European Pat. Off. . |
| 2 533 513 | 3/1984 | France . |

*Primary Examiner*—David R. Hudspeth
*Assistant Examiner*—Robert Louis Sax
*Attorney, Agent, or Firm*—Staas & Halsey

[57] ABSTRACT

A speech recognizing apparatus compares a speech command from a user with one of registration patterns stored in a storage unit in turn. Then if the speech command coincides with one of the registration patterns, the speech recognizing apparatus controls a predetermined electronic apparatus associated with an operation related to the registration pattern. If the speech command does not coincide with any one of the registration patterns, the speech recognizing apparatus stores into a memory the speech command as a new registration pattern in which the speech command is related to a manipulation of the electronic apparatus produced by the user immediately after speech command is produced.

4 Claims, 8 Drawing Sheets

Fig. 4(a)

| REGISTRATION PATTERN | OPERATION | THE FIRST REGISTRATION | THE SECOND REGISTRATION |
|---|---|---|---|
| | | OPEN WINDOW | |
| | | WO 1 | |

Fig. 4(b)

| REGISTRATION PATTERN | OPERATION |
|---|---|
| | OPEN WINDOW / OPEN FULLY WINDOW |
| | WO 1 / WO 1 |

Fig. 4(c)

| REGISTRATION PATTERN | OPERATION |
|---|---|
| | CHARGE STATION |
| | WO 1, VOL 0 |

METHOD AND APPARATUS FOR SPEECH RECOGNITION

This application is a continuation of application Ser. No. 08/253,218, filed Jun. 2, 1994, now abandoned, which is a continuation of Ser. No. 07/801,546, filed Dec. 2, 1991, now abandoned.

BACKGROUND OF THE INVENTION

1. Field of the Invention

The present invention relates to a speech recognizing apparatus and more particularly to the speech recognizing apparatus inside a vehicle, which operates by a speech command from a driver.

2. Description of the Related Art

It is convenient for a person to control an apparatus by producing a speech command without manipulating the apparatus by hand, i.e., switching, dialing and keying, etc. Therefore, by providing a vehicle system with said apparatus operated by speech command, the driver can safely control the apparatus in the vehicle (for example opening and closing a power window) during operation of the vehicle.

However, the speech command has already been defined as words and phrases registered in a storage means and so the apparatus is not responsive to speech commands different from those specific words and phrases. For example, the apparatus operated by the speech command "Open window" is not responsive to the speech command "Open fully window".

Generally, a person's memory is restrictive and thus it is impossible to retain many speech commands in said memory for a long duration. Furthermore, it is inconvenient for a driver to have to use plural speech commands to initiate plural operations in the vehicle, i.e., "Open window" and "Down volume", etc.

SUMMARY OF THE INVENTION

The purpose of the present invention is to enable the speech recognizing apparatus, which operates an electronic apparatus connected with it using a speech command produced by a user, to store the speech command into a storage means as a new registration pattern in which the speech command is related to a desired manipulation of the electronic apparatus by the user immediately before or after the speech command is produced.

Further, the purpose of the present invention is to provide said speech recognizing apparatus with more useful functions capable of preventing an undesirable registration of said speech recognizing apparatus and/or an undesirable operation of said electronic apparatus, to delete an unneeded registration pattern and to confirm the registration pattern by an audio response or a display corresponding to that registration pattern.

The speech recognizing apparatus according to the present invention compares the speech command from the user with one of the registration patterns in the storage means in turn. Then if the speech command coincides with one of the registration patterns, the speech recognition apparatus controls a predetermined electronic apparatus associated with the operation related to the registration pattern, and if the speech command does not coincide with any one of the registration patterns, the speech recognition apparatus stores the speech command into the storage means as a new registration pattern in which the speech command is related to the manipulation of the electronic apparatus by the user immediately after the speech command is produced.

Also, the speech recognizing apparatus according to the present invention is provided with a step of command registration that determines whether the new registration pattern is to be stored into the storage means or not, a step of command deletion that deletes the registration pattern from the storage means selectively and a step of command confirmation that confirms the registration pattern by an audio response or a display corresponding to the speech command.

According to the present invention, the user produces a speech command and the speech recognizing apparatus in turn compares the speech command with one of the command registration patterns in the storage means, determines the kind of speech command and then in order to confirm the same, inquires of the speech command by an audio response using a speech synthesis and/or by a display on a screen. If there are several kinds associated with the speech command, the speech recognizing apparatus inquires repeatedly from the first candidate in turn. If said inquiry produces a negative response (for example, "NO"), said inquiry continues. If there is no negative response to the i-th candidate for a predetermined period, it is determined that the speech command relates to the i-th candidate's registration pattern and the speech recognition apparatus operates the apparatus connected with said pattern (i.e., radio and air-conditioner, etc.) in accordance with a control code corresponding to the registration pattern.

Further, in addition to the general operation of the speech recognizing apparatus as described above, if there is a manipulation of the connected apparatus immediately after or before the speech command is produced, the speech recognizing apparatus according to the present invention stores the speech command into the storage means as a new registration pattern and in which the speech command is related to the manipulation. Therefore, the new registration pattern can be used to recognize the new speech command that was not recognized before that registration.

Thus, the talker can easily operate the system using said speech recognizing apparatus even though he may forget the speech commands for the system, and further it is advantageous that in said system one speech command can be related to a plural of apparatus manipulation.

Further, as in the case of above-mentioned operation it may occur that some speech commands are registered as new speech commands unexpectedly during speech, so said step of the command registration allows registration to prevent said condition. Similarly said step of command deletion can be used to delete a registration pattern when some registration patterns have been registered incorrectly or have become redundant and said step of command confirmation can be used to confirm the registration pattern when the operator wishes to confirm correct registration or when the operator wishes to confirm deleting a speech command.

Also, in order to prevent an error in the operation of the apparatus, said step of the command registration may have an optional function that determines whether or not the apparatus can be operated.

BRIEF DESCRIPTION OF THE DRAWINGS

The present invention will be more clearly understood from the description as set forth below with reference to the accompanying drawings.

FIG. 3 is a diagram illustrating the positional orientation of FIG. 3A and FIG. 3B.

FIGS. 4(a)–4(c) are schematic view explaining the registration pattern of the preferred embodiment.

DESCRIPTION OF THE PREFERRED EMBODIMENTS

Figure 1:
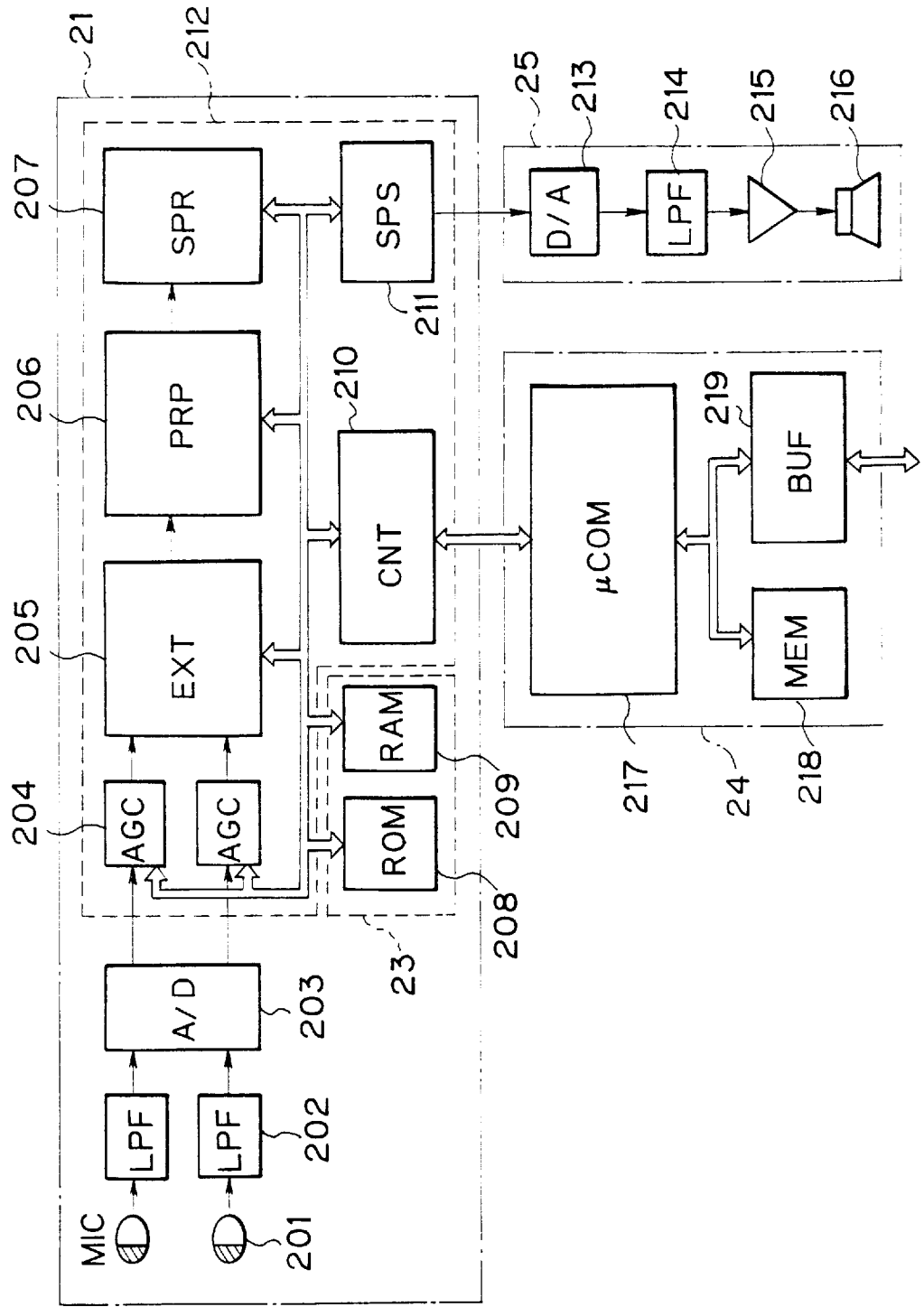
FIG. 1 is a functional block diagram of a preferred embodiment according to the present invention.

FIG. 1 shows a functional block diagram of a preferred embodiment according to the present invention. Reference numeral 21 designates a speech recognizing unit for a speech command, likewise 22 and 25 designate an apparatus control unit for operating the electronic apparatus connected to the same and a confirmation output unit for confirming the result of the speech recognition by an audio response, respectively.

The speech recognizing unit 21 has two input terminals connected with two microphones 201 respectively and each output signal from the microphone is provided with a low-pass filter (LPF) 202. The low-pass filter 202 eliminates a high frequency noise from the signal, and limits a bandwidth of the signal and then the output signal is provided to an analog-digital converter (A/D) 203. The analog-digital converter 203 converts an analog signal of the output signal into a digital signal and the digital signal is provided to a a digital signal processor 212 and applied as inputs to an automatic gain control (AGC) unit 204 in the system.

The automatic gain control unit 204 causes a level of the digital signal to be constant and an output signal from the automatic gain control unit 204 is provided with a direction and distance criterion unit 205. The direction and distance criterion unit 205 extracts a signal in phase between two signals produced by the two microphones 201 respectively so that the extracted signal only has a signal produced by an operator positioned the same distance from each microphone 201, and an extracted signal is provided to a pre-processing unit 206.

The pre-processing unit 206 eliminates a noise signal from said signal first and then measures the frequency spectrum of the signal by passing through n band-pass filters (n: integer), thereafter it converts each level of the frequency spectrum into an absolute value (ABS) respectively, finally each level of the frequency spectrum is determined and each output is provided with a speech recognition unit 207.

The speech recognition unit 207 executes a speech recognition processing, a registration of a speech pattern and various judgments by using memories 208, 209, which comprises the first storage unit designated by reference numeral 23. The memory 208 is a read only memory (ROM) in which various standard registration patterns divided or generated by men and women are stored. The memory 209 is a random access memory (RAM) in which the new registration patterns to be added, according to the present invention, are stored. A speech synthesis block 211 executes a speech synthesis processing in order to respond to the operator by an audio response.

A control unit 210 controls the automatic gain control unit 204, the direction and distance criterion unit 205, the pre-processing unit 206, the speech recognition unit 207, the memories 208, 209 and the speech synthesis block 211, respectively or wholly, and permits the system 21 to fulfill its function as the speech recognizing unit.

A digital output signal from the speech synthesis unit 211 is converted to an analog signal through a digital-analog converter (D/A) 213 in the confirmation output unit 25, and the analog signal is provided with a low-pass filter (LPF) 214 that eliminates high frequency noise. An output signal from the low-pass filter 214 is amplified through a power amplifier 215 and drives a loud speaker 216.

Also, the system 212 transmits a signal, in accordance with a result of the speech recognition, to a micro-processor ($\mu$COM) 217 in the apparatus control unit 22. In order to operate several external apparatuses connected with the apparatus control unit 22, the micro-processor 217 sends a signal in accordance with the result of the signal processing in the system 212 to the external apparatus through a buffer unit (BUF) 219. Also, the micro-processor 217 receives a result of an operation of the external apparatus through the buffer unit 219 and then sends a signal in accordance with the operation of the external apparatus to the system 212.

The micro-processor 217 executes a translation of a signal received from the system 212 into an operation code to be transmitted to an external apparatus and translated an event code received from an external apparatus to a response format transmitted to the system 212 by using a memory (MEM) 218 having a conversion table for said translation. The buffer unit 219 comprises a RAM converting a transmission speed between the micro-processor 217 and the external apparatus. The memory 218 comprises a ROM having said conversion table and communication protocols in relation to the system 212 and the external apparatus, and the RAM in buffer 219 is used for temporary storage of data.

Therefore, the system 212 can realize operation of the external apparatus by the response converted from the event code and store the same into the RAM 209; the new registration pattern to which a speech command can be related for that operation using the response.

Figure 2:
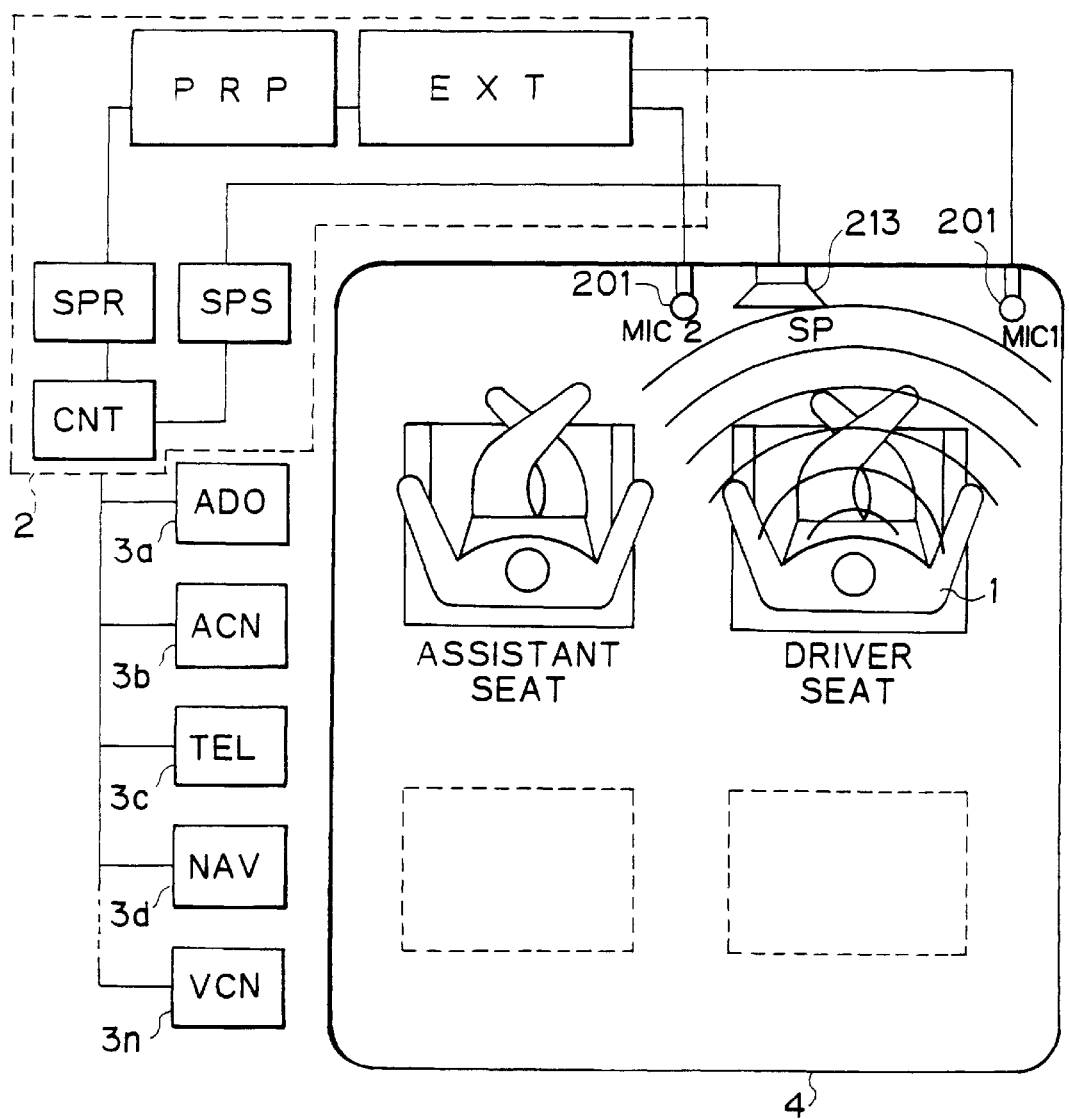
FIG. 2 is a schematic view of a concrete embodiment according to the present invention.

FIG. 2 shows a schematic view of a concrete embodiment according to the present invention.

Disposing right and left two microphones 201 in front of a driver 1, it is possible to extract only a speech signal in phase from the driver 1 because of the similar distance from the driver 1 to each microphone 201 and prevent an error operation by speech from the direction of a passenger seat because of the different distances from a passenger seat to each microphone 201. Reference numeral 2 designates the same speech recognizing apparatus as described in FIG. 1 and thus the functional blocks inside reference numeral 2 are the same in FIG. 1.

FIG. 2 shows an audio apparatus 3a, an air-conditioner 3b, a telephone 3c, a navigation system 3d . . . and a vehicle controller 3n associated with a vehicle 4, and further the vehicle controller 3n includes a power window controller, a door-lock controller and a wiper controller, etc.

Figure 3A:
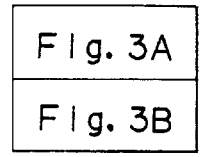
FIGS. 3A and 3B are flow chart explaining the present invention.
Figure 3A:
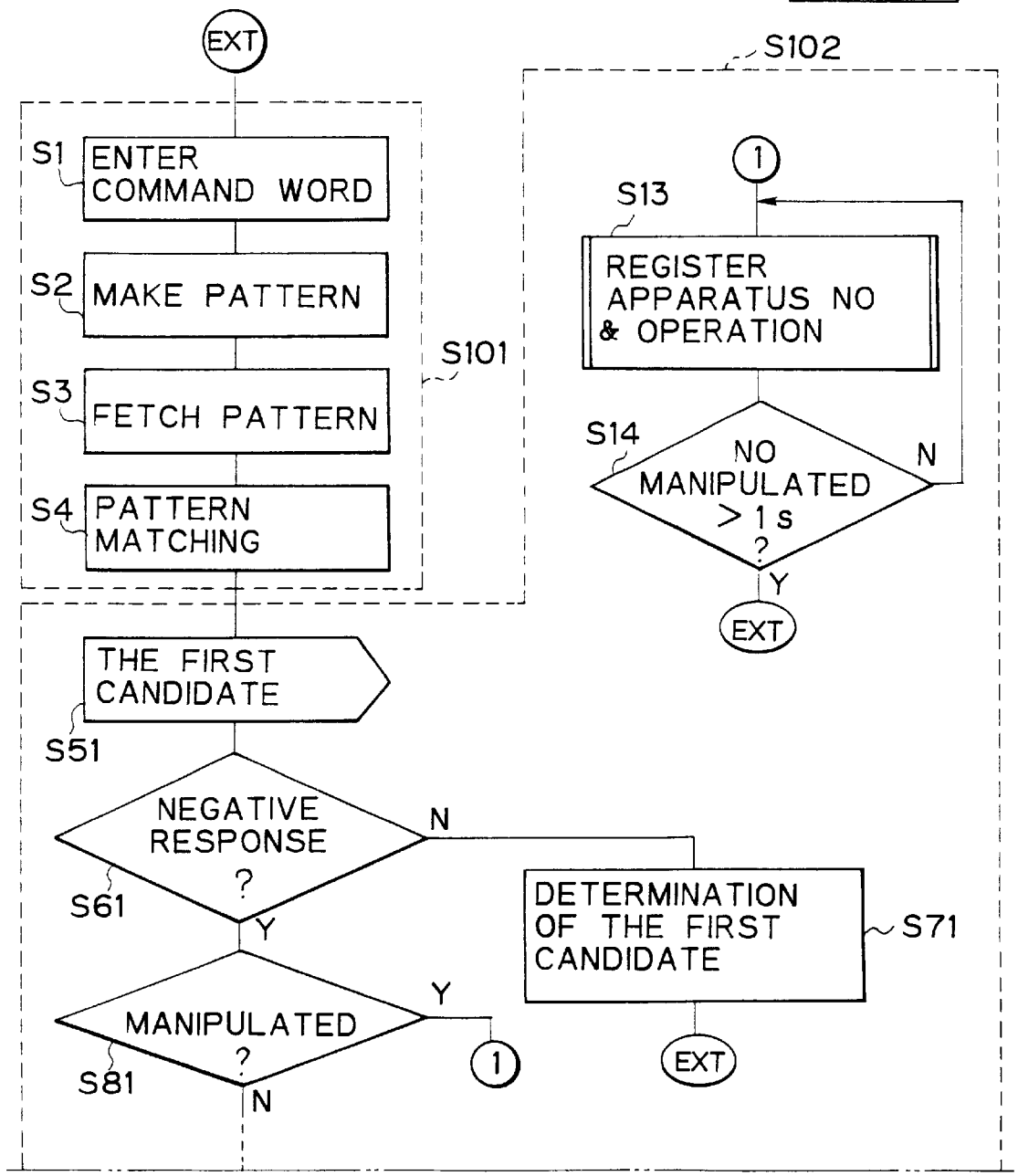
Figure 3B:
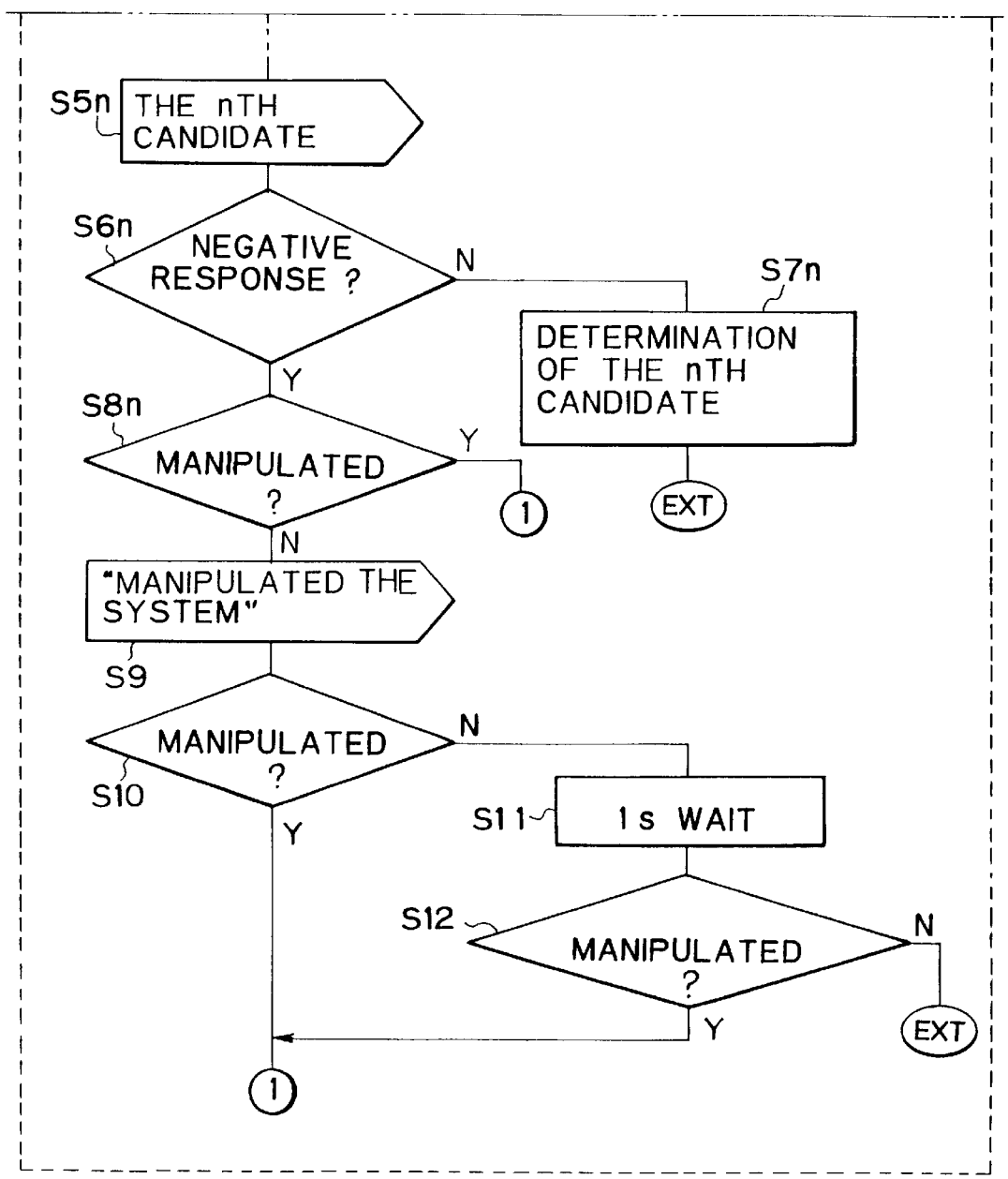

FIGS. 3A and 3B are flow charts explaining the present invention.

When determining that there is a speech input from the driver, step S1 extracts a speech command from the speech input, step S2 generates a pattern of the speech command, step S3 fetches a pattern from a memory and step S4 executes a pattern matching process between the generated pattern and the fetched pattern.

Due to the result of the analysis processing as described above, step S51 reproduces the first candidate seeming to correspond to the speech command using an audio response by speech synthesis. Thereafter, step S61 checks whether a negative response (NO) is obtained from the audio response within a predetermined time. If there is no negative response, step S71 determines that the speech command is equal to the first candidate, or if there is a negative response, step S81 waits for system manipulation by the user.

If there is manipulation then step S13 is executed, but if there is no manipulation within the predetermined time the same processing above-mentioned at steps S51, S61, S71 and S81 are repeated as a combination with the next candidate. Steps S5n, S6n, S7n and S8n show the n-th candidate is reproduced.

If there is no candidate or no manipulation in the n-th processing, step S9 produces an audio response "manipulate the system" by speech synthesis and then steps S10, S11 and S12 determine whether there is a manipulation by the user within a predetermined time (1 second). If there is manipulation, said step S13 is executed, and if there is no manipulation, the process according to the present invention, ends.

Step S13 registers or stores a pattern in memory 209, for example, in which the speech command words or phrases at step S1 are related to said manipulation. Thereafter, step S14 checks whether there is a next manipulation within a predetermined time (1 second) and if there is a next manipulation, the manipulation at step S14 is also registered in combination with the prior manipulation at steps 8n or 10 in relation to said speech command words or phrases at step 1. Thus, according to the prevent invention, manipulation of more than one external apparatus can be defined for one speech command by repeating steps S13 and S14.

In the above description, the steps from S1 to S4 will be used as a command analysis routine S101 hereafter and likewise the steps following after step S51 (steps S51–S14) as a command registration routine S102.

FIG. 4(a) shows the first registration pattern as a standard speech command stored in a memory, in which a registration pattern "Open window" is stored in the upper row, and the operation (W01, a window opening operation) related to the registration pattern is stored in the lower row.

FIG. 4(b) shows the registration pattern having two patterns, one is the first registration pattern as mentioned and the other is the second registration pattern newly added by the user. Although the second registration pattern has the same operation (W01) as the first registration pattern shown in the lower row, the registration pattern in the upper row is different from the first. In FIG. 4(b), the second registration pattern is defined as a speech command "Open fully window" and thus the user can operate the system by using a speech command "Open fully window" if he forgets (or may not remember at the beginning) the speech command "Open window".

FIG. 4(c) shows a registration pattern "charge station" having two operations (W01, V0L0). In this case, if a man driving a car produces one speech command "charge station", a side window of the car close to the driver is opened by the first operation (W01) in order to pay, and at the same time, an audio output from an audio apparatus inside the car is muted by the second operation (V0L0) in order to have a conversation. Therefore it is very convenient to use said speech command having plural operations in such a case.

Figure 5:
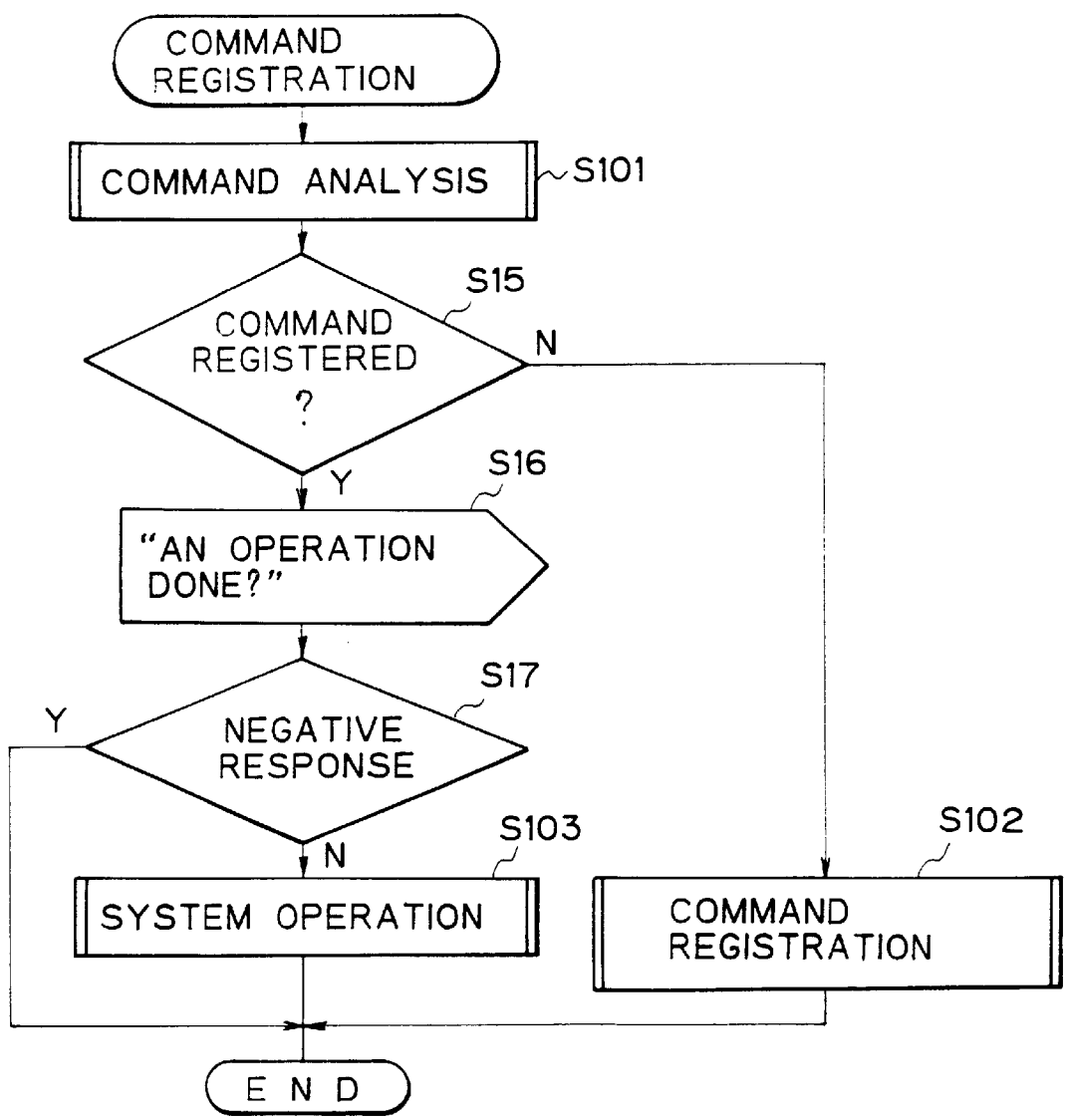
FIG. 5 is a flow chart explaining the step of the command registration.
Figure 6:
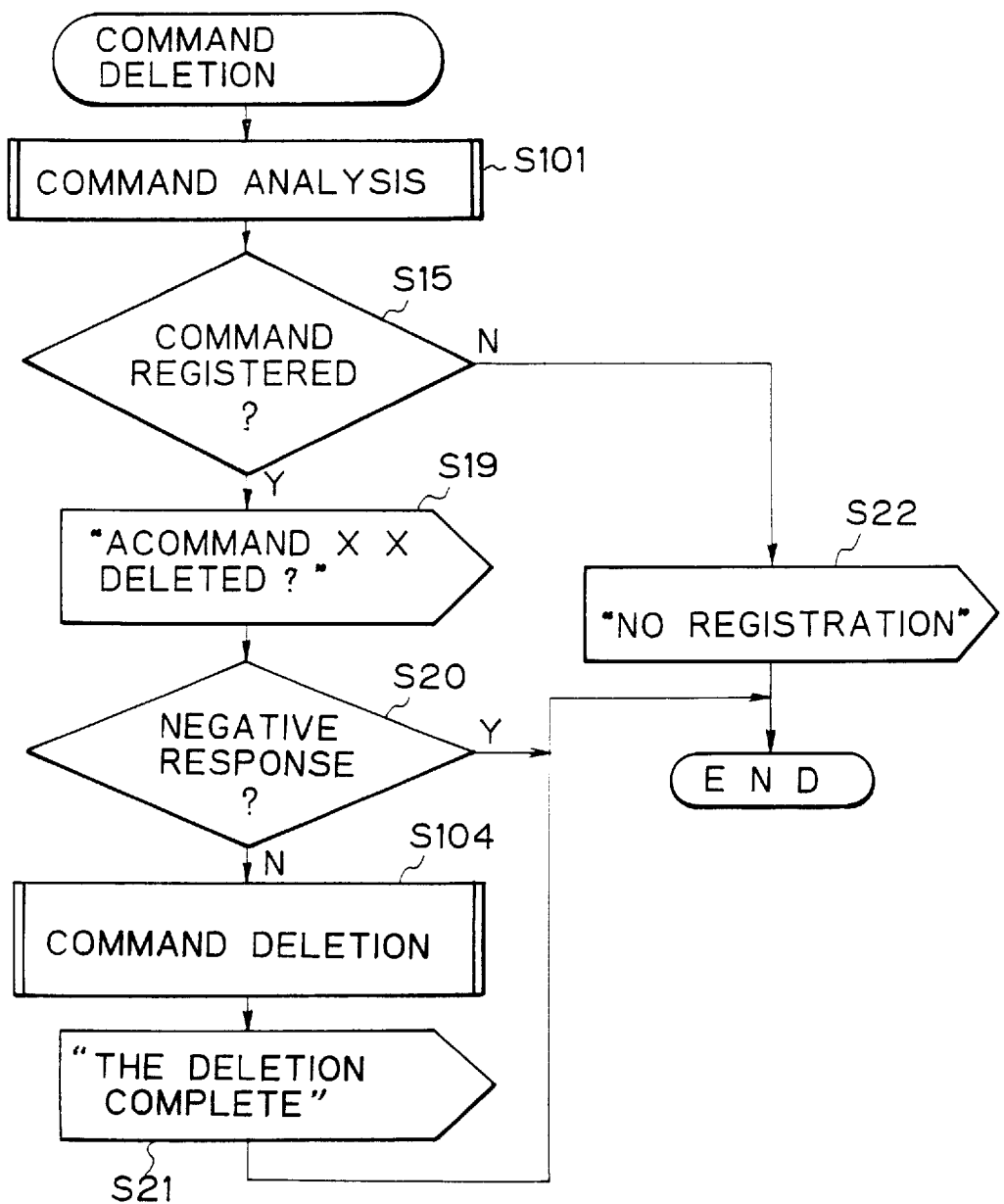
FIG. 6 is a flow chart explaining the step of the command deletion.
Figure 7:
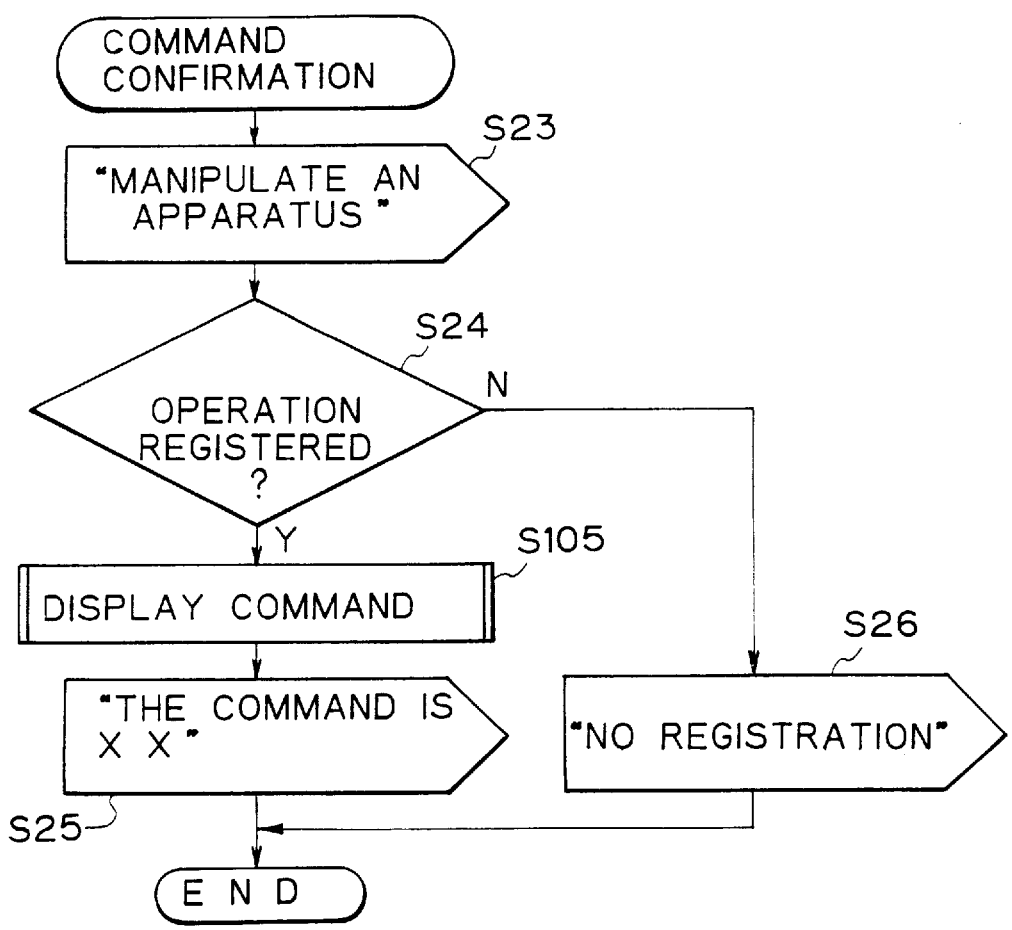
FIG. 7 is a flow chart explaining the step of the command confirmation.
Figure 1:
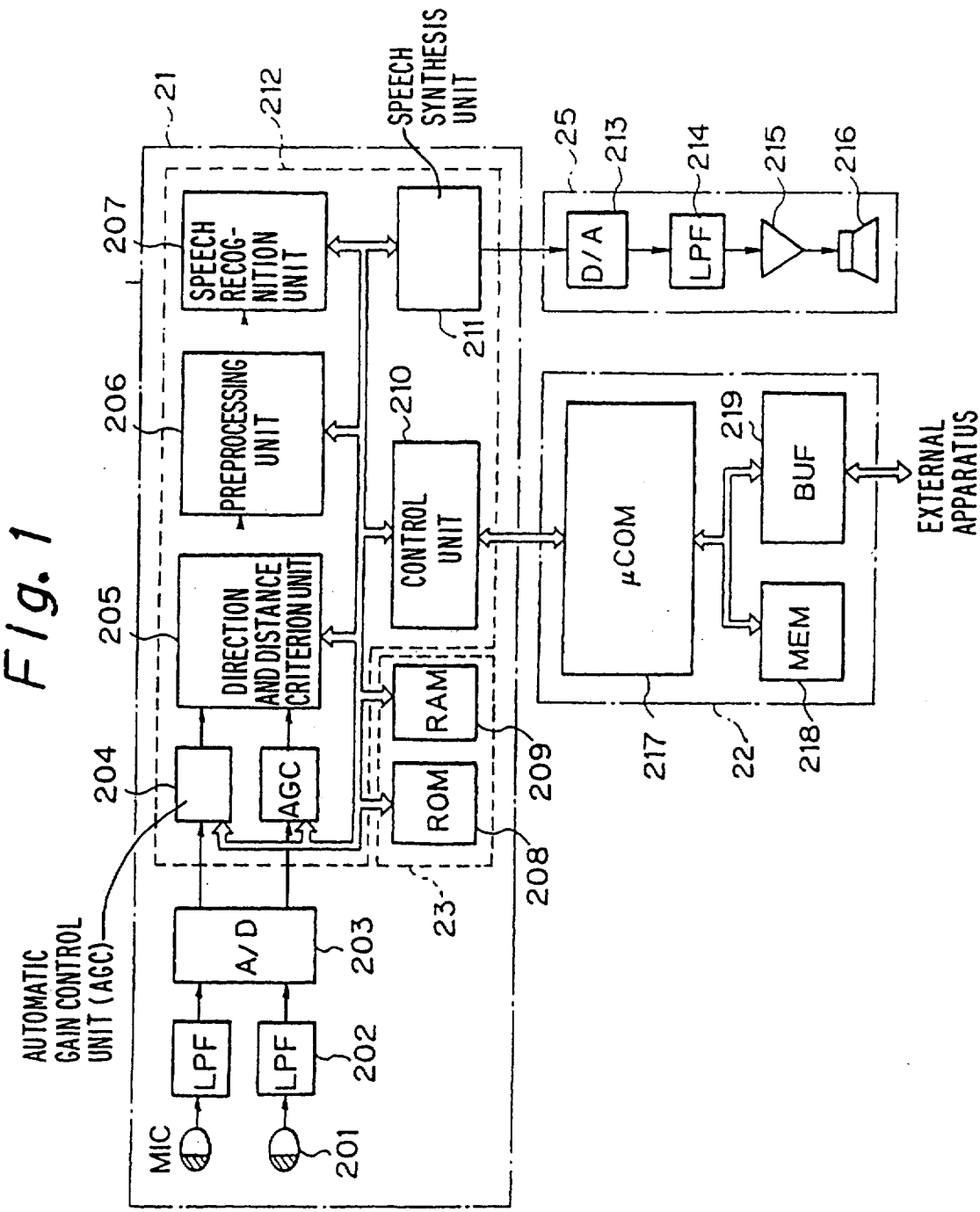
Figure 2:
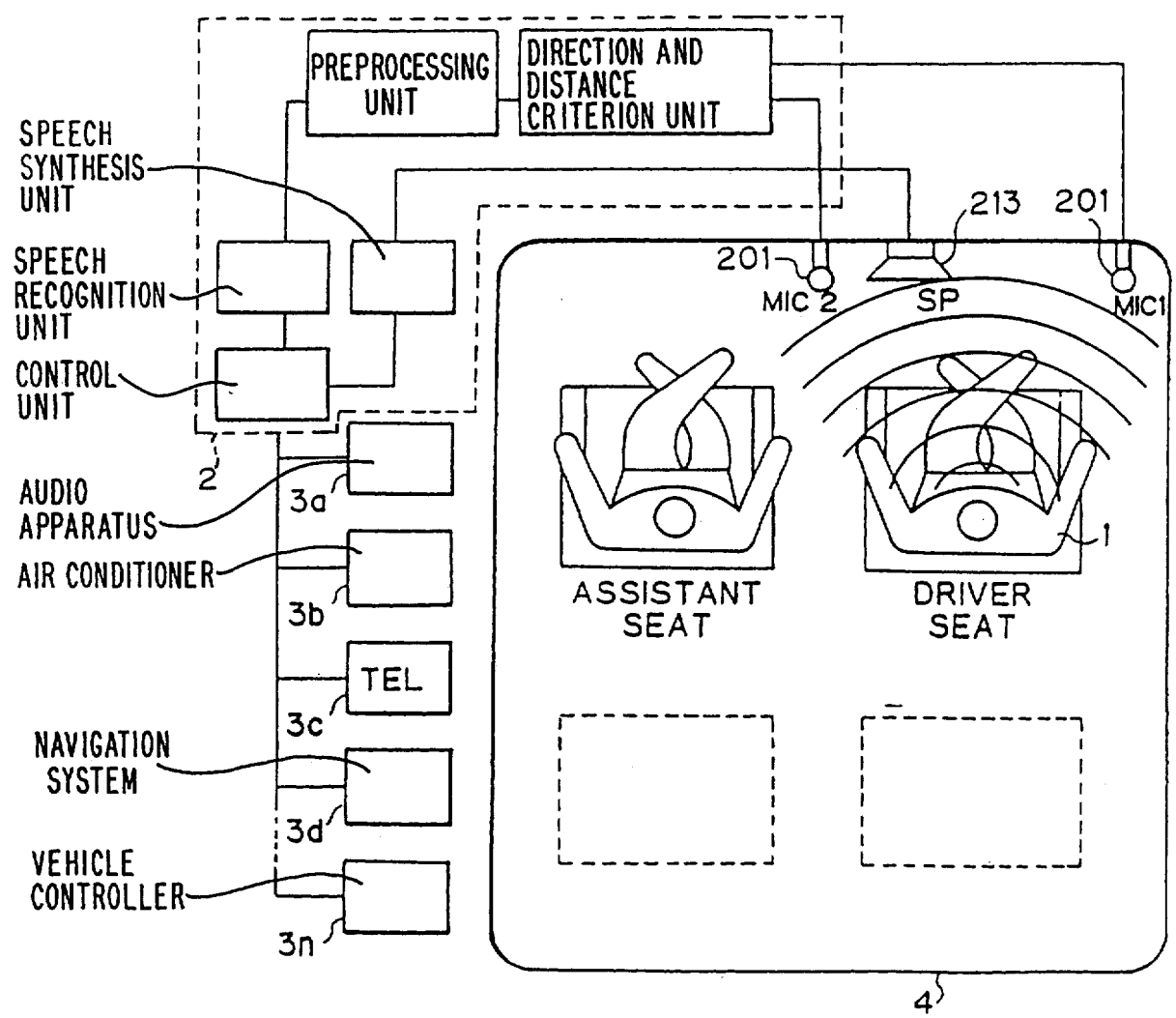
Figure 3B:
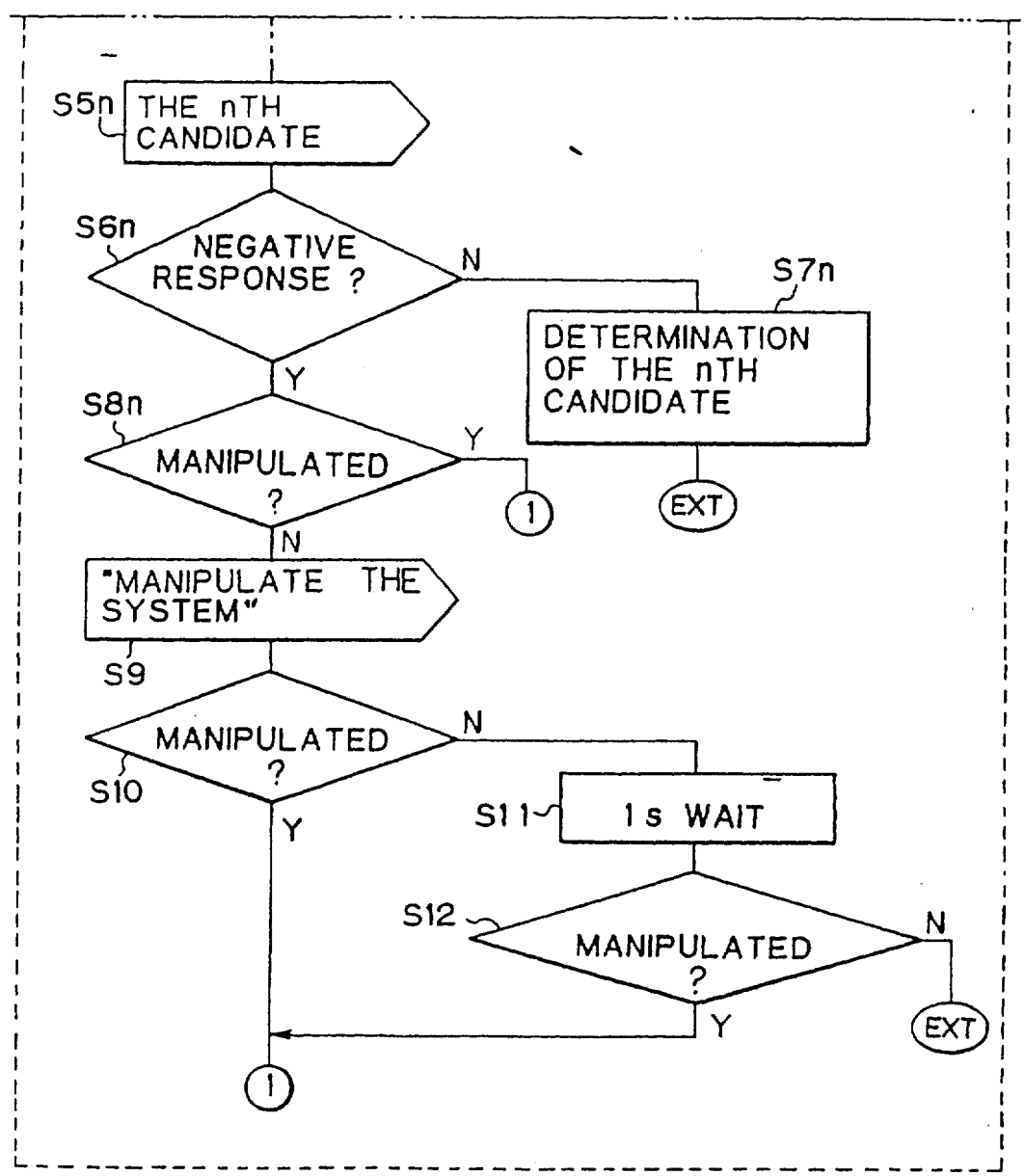
Figure 6:
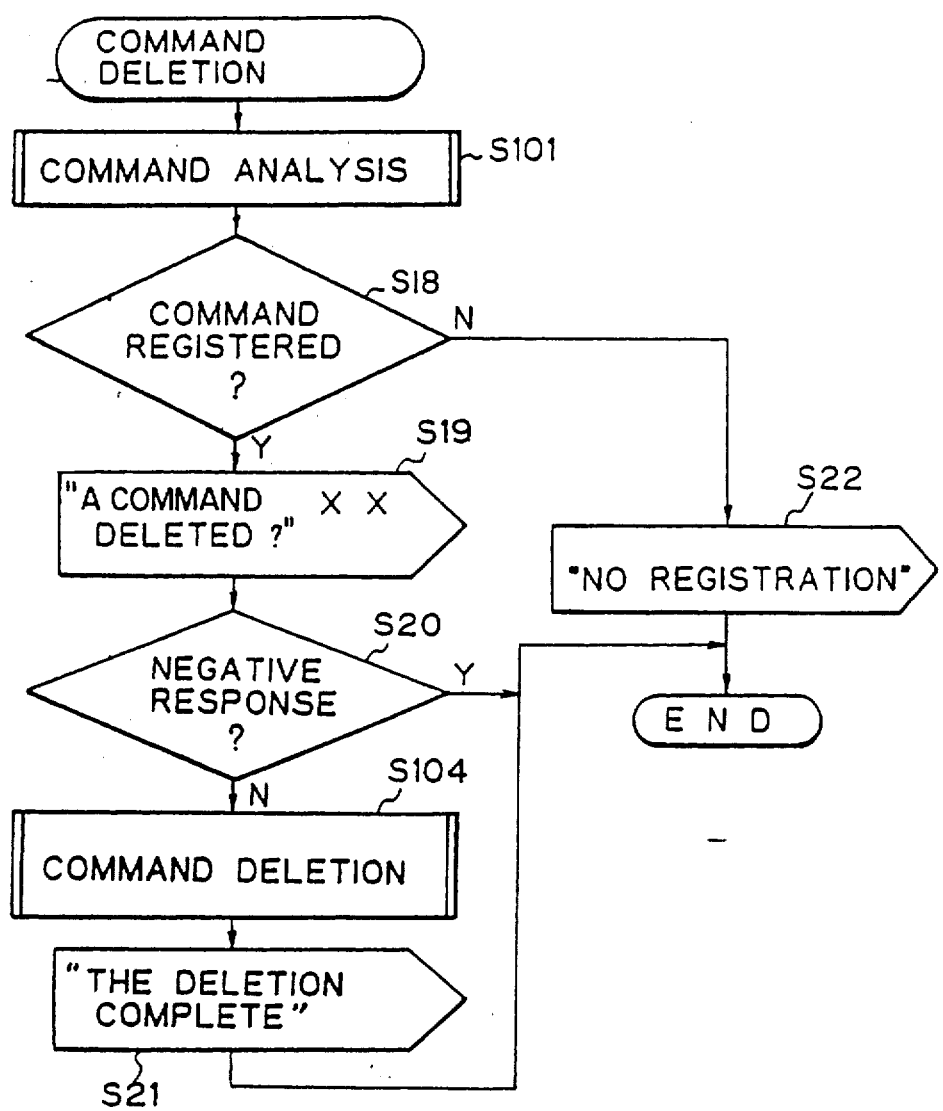

FIG. 5, FIG. 6 and FIG. 7 show a step of command registration, a step of command deletion and a step of command confirmation respectively. These steps begin with an instruction through an electrical signal using mode setting switches or speech commands, i.e., "The command registration mode", "The command deletion mode" and "The command confirmation mode", etc.

FIG. 5 shows the step of the command registration used to prevent an error in registration or an error in operation of an apparatus as described above.

In FIG. 5, step S101 is the same as the command analysis routine S101 (i.e., steps S1–S4) in FIG. 3A and a speech command analyzed by step S101 is checked to determine if the speech command is registered at step S15. If there is a registration pattern corresponding to the speech command then step S16 is executed. The step S16 produces an audio response "An operation done?" and then at step S17 if there is a negative response, the step of the command registration ends or if there is no response within a predetermined time, step S103 operates the system in accordance with the registered operation related to the speech command as described in FIG. 4. If there is no registration pattern at step S15, step S102, that is the same step described as the command registration routine S102 in FIGS. 3A and 3B is executed.

During the step of the command registration routine S102, the next command at the step S101 is also analyzed in the same way as in FIG. 3A. Thus, although the step of the command registration is performed, the speech recognizing apparatus can store a new registration pattern, produce an audio response in order to confirm a speech command obtained by the speech recognition and operate the external apparatus connected to it.

FIG. 6 shows that the step of command deletion is used to delete an error registration pattern or a pattern become redundant.

In FIG. 6, a speech command analyzed by said step S101 is checked to determine whether the speech command is registered at step S18. If there is a registration pattern corresponding to the speech command then step S19 is executed. The step S19 produces an audio response "A command X X deleted?" and then at step S20, if there is a negative response, the step of the command deletion ends, or if there is no response within a predetermined time, the registration pattern and the operation related to the speech command, as described in FIG. 4, is deleted in step S104. Step S21 produces the audio response "the deletion complete" and then the step of command deletion ends. If there is no registration pattern at step S18, the step S22 produces an audio response "No registration" and the step of the command deletion ends.

FIG. 7 shows that the step of command confirmation is used to confirm the registration pattern by an audio response or a display.

In FIG. 7, at the beginning an audio response "Manipulate an apparatus" is produced at step S23, and then the user manipulates the desired apparatus in order to designate a command to be confirmed. The user's manipulation is checked to determine whether there is an operation corresponding to the manipulation at step S24. If there is a registered operation corresponding to the manipulation at step S24 step S105 is executed. The step S105 displays the registered commands associated with the manipulation on a screen of a television set or a navigation system of a car for example. Furthermore, next step S25 produces an audio response "The command IS x x " is produced and the step of confirmation ends. If there is no registered operation corresponding to the manipulation at step S24, an audio response "No registration" is produced at step S26, and the step of confirmation ends.

Still, both the steps of deletion and confirmation are repeatedly executed as described above as far or long as there is no appointment or action by the user changing the steps which are executed.

As described above, the speech recognizing apparatus according to the present invention, which operates the apparatus by a speech command, can register any speech command produced by the user and the speech command is related to the desired operation manipulated by the user.

Thus, there is no problem if the user has forgotten the speech command. Further, the apparatus according to the present invention has great flexibility by using a speech command related to a plurality of operations.

Further, by using the microprocessor in the apparatus control unit, which converts a speech command pattern into an operation code in order to operate the external apparatus connected to it, and an event code from an external apparatus into a response format to the speech recognizing apparatus of the invention, even if a new apparatus is connected to the speech recognizing apparatus, it is possible to use the speech recognizing apparatus only by changing the software of said microprocessor and need not change the speech recognizing unit itself and the contents of the memories storing speech patterns.

Furthermore, by having the steps of command registration, command deletion and command confirmation, the speech recognizing apparatus according to the present invention can operate error-free and it is very convenient for the user.

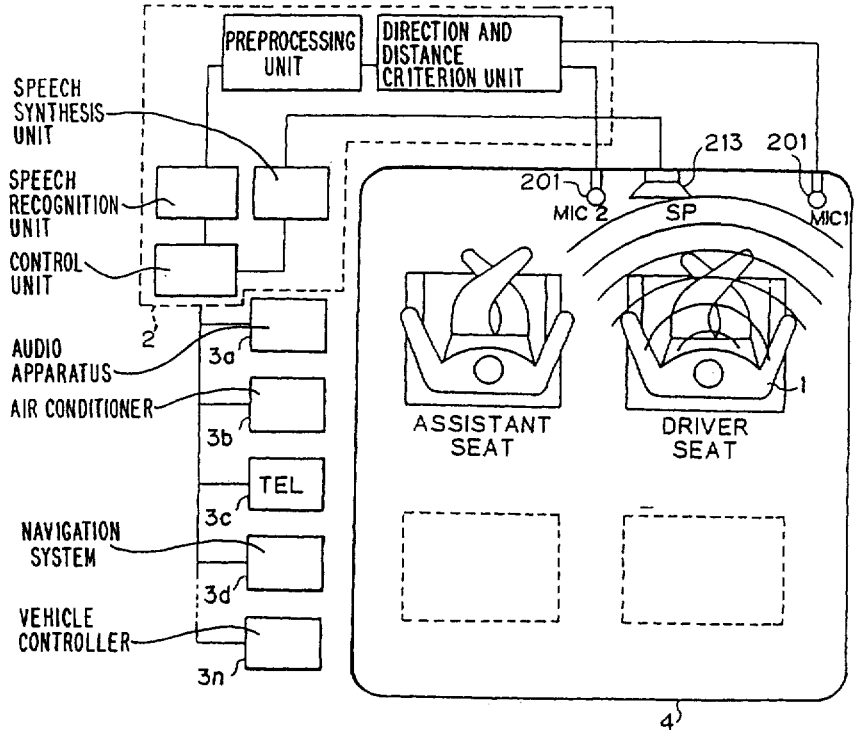

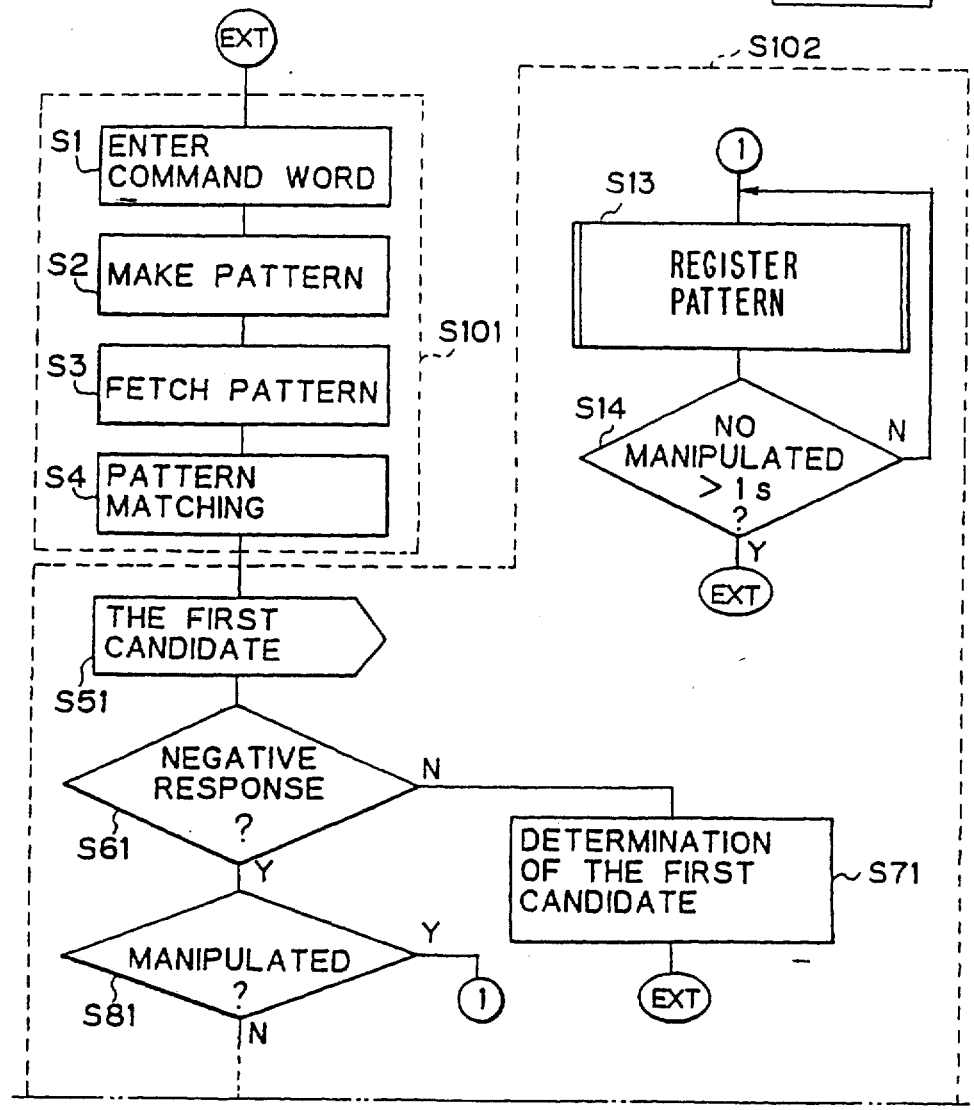

I claim:

1. An apparatus for recognizing speech, that stores a registration pattern of a speech command and a corresponding operation, both the speech command and the corresponding operation being not prepared, and that controls an external apparatus connected thereto in accordance with the corresponding operation when the speech command is recognized by processing of speech input, comprising:

input means for inputting speech;

speech recognizing means for recognizing, in a command registration mode, an input speech pattern in the speech input by said input means;

confirmation output means for providing a confirmation of a result from said speech recognizing means;

storage means for storing a registration pattern containing a speech command included in the input speech pattern recognized by said speech recognizing means and a corresponding operation; and apparatus control means for controlling said external apparatus by outputting and inputting control data for the corresponding operation to and from the external apparatus and, in the command registration mode, registering into said storage means the corresponding operation consisting of manipulation data produced by the external apparatus either immediately before or after input of the speech containing the input speech pattern including the speech command.

2. An apparatus according to claim 1, wherein said speech recognizing means in a command operation mode recognizes the speech command registered in said storage means from said speech input by said input means; and wherein said apparatus control means in the command operation mode controls the external apparatus by outputting to the external apparatus the manipulation data registered in said storage means for the corresponding operation of the speech command recognized by said speech recognizing means.

3. A method for recognizing speech and controlling an external apparatus, comprising:

inputting first speech signals in a command registration mode;

recognizing an input speech pattern to be registered from the first speech signals;

registering the speech pattern as a speech command after the input speech pattern is first recognized; and registering a new operation corresponding to the speech command and consisting of manipulation data produced by the external apparatus either immediately before or immediately after the speech command is produced.

4. A method according to claim 3, further comprising:

recognizing, from second speech signals input in a command operation mode, the speech command registered in the command registration mode; and outputting the manipulation data to control the external apparatus when the speech command is recognized in the second speech signals.

* * * * *

UNITED STATES PATENT AND TRADEMARK OFFICE
CERTIFICATE OF CORRECTION

PATENT NO.: 5,852,804
DATED: December 22, 1998
INVENTOR: Kazuya SAKO

It is certified that errors appear in the above-identified patent and that said Letters Patent is hereby corrected as shown below:

Title Page [73] Assignee, "Fujitsu Limited, Kawasaki, Japan" should be --Fujitsu Ten Limited, Kobe-shi, Japan--.

Figs. 1, 2, 3A, 3B and 6 should be replaced with the attached drawings.

Column 3, line 5, "chart" should be --charts--;
          line 7, "view" should be --views--;
          line 36. "a a" should be --a--.

Signed and Sealed this

Fourteenth Day of March, 2000

Attest:

Q. TODD DICKINSON

Attesting Officer

Commissioner of Patents and Trademarks

United States Patent [19]

Sako

[11] Patent Number: 5,852,804
[45] Date of Patent: Dec. 22, 1998

[54] METHOD AND APPARATUS FOR SPEECH RECOGNITION

[75] Inventor: Kazuya Sako, Kakogawa, Japan

[73] Assignee: Fujitsu Limited, Kawasaki, Japan

[21] Appl. No.: 838,909

[22] Filed: Apr. 11, 1997

Related U.S. Application Data

[63] Continuation of Ser. No. 253,218, Jun. 2, 1994, abandoned, which is a continuation of Ser. No. 801,546, Dec. 2, 1991, abandoned.

[30] Foreign Application Priority Data

Nov. 30, 1990 [JP] Japan .................. 2-334766

[51] Int. Cl.$^6$ .................. G10L 5/02; G10L 5/06; G10L 9/00
[52] U.S. Cl. .................. 704/275; 704/243; 704/244; 704/245
[58] Field of Search .................. 704/275, 243, 704/244, 245

[56] References Cited

U.S. PATENT DOCUMENTS

| | | | |
|---|---|---|---|
| 4,158,750 | 6/1979 | Sakoe et al. | 395/2 |
| 4,181,813 | 1/1980 | Marley | 395/2 |
| 4,426,733 | 1/1984 | Brenig | 395/2 |
| 4,528,687 | 7/1985 | Noso et al. | 395/2 |
| 4,532,648 | 7/1985 | Noso et al. | 395/2 |
| 4,618,984 | 10/1986 | Das et al. | 395/2 |
| 4,725,956 | 2/1988 | Jenkins | 364/434 |
| 4,827,520 | 5/1989 | Zeinstra | |
| 4,862,363 | 8/1989 | Krisher et al. | |
| 4,864,622 | 9/1989 | Iida et al. | 395/2 |
| 4,896,357 | 1/1990 | Hatano et al. | 395/2 |
| 5,199,080 | 3/1993 | Kimura | 704/275 |
| 5,349,687 | 9/1994 | Ehlig | 704/275 |

FOREIGN PATENT DOCUMENTS

| | | |
|---|---|---|
| 0 077 194 | 4/1983 | European Pat. Off. |
| 2 533 513 | 3/1984 | France |

*Primary Examiner*—David R. Hudspeth
*Assistant Examiner*—Robert Louis Sax
*Attorney, Agent, or Firm*—Staas & Halsey

[57] ABSTRACT

A speech recognizing apparatus compares a speech command from a user with one of registration patterns stored in a storage unit in turn. Then if the speech command coincides with one of the registration patterns, the speech recognizing apparatus controls a predetermined electronic apparatus associated with an operation related to the registration pattern. If the speech command does not coincide with any one of the registration patterns, the speech recognizing apparatus stores into a memory the speech command as a new registration pattern in which the speech command is related to a manipulation of the electronic apparatus produced by the user immediately after speech command is produced.

4 Claims, 8 Drawing Sheets